United States Patent [19]

Weimer

[11] 3,811,055

[45] May 14, 1974

[54] CHARGE TRANSFER FAN-IN CIRCUITRY

[75] Inventor: Paul Kessler Weimer, Princeton, N.J.

[73] Assignee: RCA Corporation, New York, N.Y.

[22] Filed: Dec. 13, 1971

[21] Appl. No.: 207,215

[52] U.S. Cl. .......... 307/304, 307/221 D, 317/235 R, 317/235 G

[51] Int. Cl. .......... H01l 19/00

[58] Field of Search .......... 307/221 R, 221 C, 243, 307/235 G

[56] References Cited

UNITED STATES PATENTS

| | | | |
|---|---|---|---|
| 3,582,683 | 6/1971 | Podraza | 307/243 |
| 3,621,283 | 11/1971 | Teer et al. | 317/235 |
| 3,651,349 | 3/1972 | Kahng et al. | 317/235 |
| 3,660,697 | 5/1972 | Berglund et al. | 317/235 |

*Primary Examiner*—Jerry D. Craig

*Attorney, Agent, or Firm*—H. Christoffersen; Henry I. Schanzer

[57] ABSTRACT

A charge transfer circuit with converging conduction paths between a plurality of signal input points and a single output terminal. Signals, applied to only one input point at a time, are propagated from any one of the input terminals to the output terminal with equal time delay and with little loss of signal level by proper selection of the nodal capacitances along the paths and at the output terminal.

14 Claims, 3 Drawing Figures

CHARGE TRANSFER FAN-IN CIRCUITRY

BACKGROUND OF THE INVENTION

One system for accessing an array, one row at a time, includes an output register having a number of stages equal to the number of rows, each stage of the register connected to a different row. The signals from the row being scanned pass a bit at a time to the register stage coupled to that row and from there are propagated stage-to-stage through the register to an output terminal. A problem arising in this type of system is that the information from the different rows is delayed by different amounts in reaching the output terminal. For example, in an array having 500 rows, the signals from the first row pass through a single register stage whereas the signals from the 500th row pass through the 500 register stages. In addition to this timing problem, the signals in the different rows are attenuated different amounts due also to the different numbers of register stages through which they pass.

Another approach for reading out arrays is to connect each row through a switch to an output terminal. But many switches of particular interest here—those suitable for integration such as transmission gates—exhibit capacitance and attenuate the signals they couple to the output terminal. For example, 500 rows with each row connected at its output through a switch to one output terminal would result in the capacitance of 500 switches present at the output terminal which would cause the signals produced by each row to be attenuated by a large factor and rendered virtually useless.

To alleviate the problem above, some have suggested the use of an amplifying device in series with each switch. This solution has the disadvantage that a small mismatch (e.g., 1 to 5 per cent) among the amplifying devices results in the signals from different rows being amplified different amounts. In systems under consideration, it is highly desirable, and in some cases essential, that each bit of information be amplified by the same factor.

SUMMARY OF THE INVENTION

A charge transfer circuit for coupling the signals applied to one of a multiplicity of input terminals onto one output terminal. Charge transfer means connected between the input points and the output terminal provide converging conduction paths between the input points and the output terminal. Each conduction path includes the same number of charge transfer devices and each path introduces substantially the same delay between its input point and the output terminal.

DETAILED DESCRIPTION OF THE INVENTION

Figure 1:
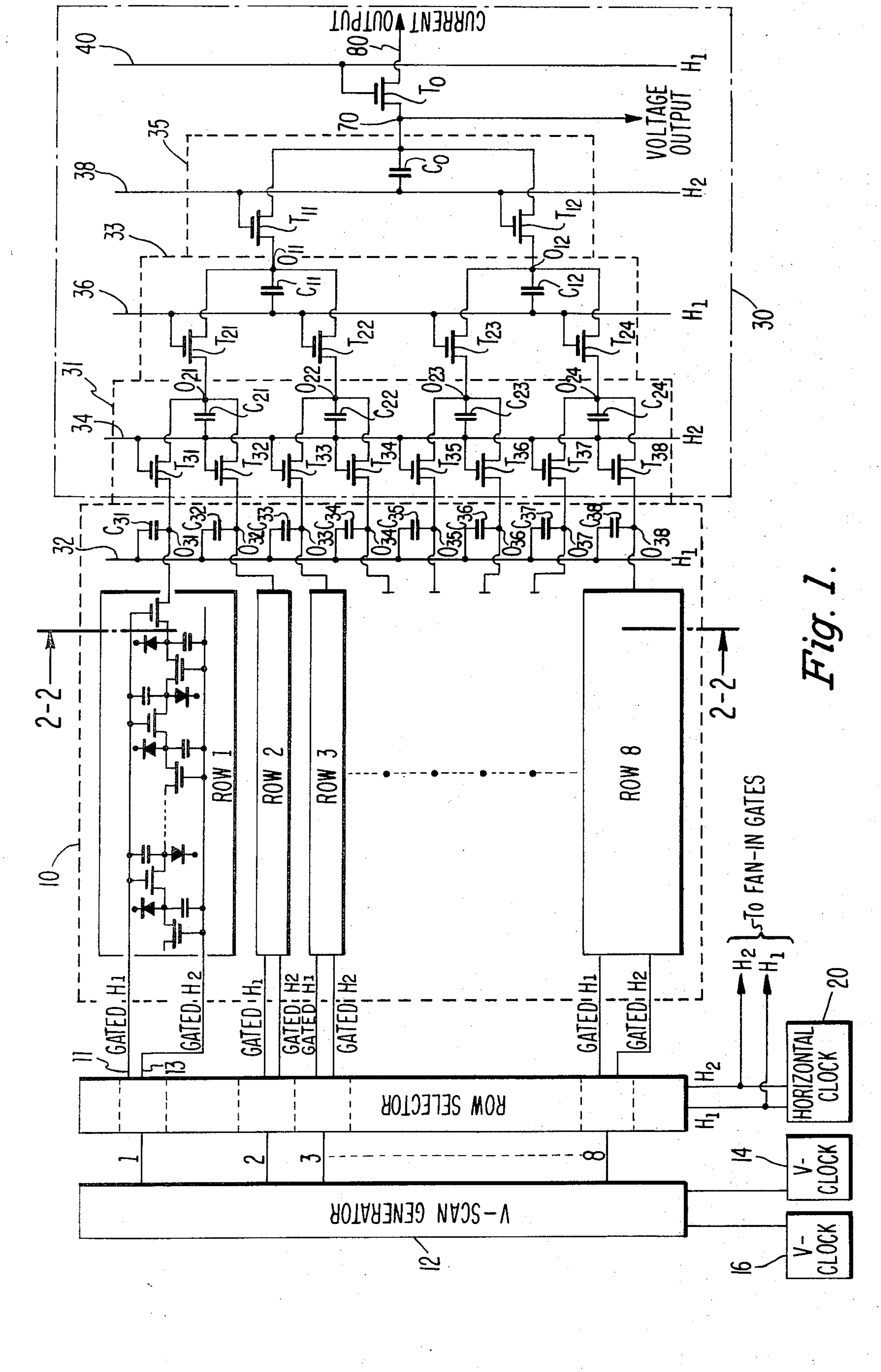
FIG. 1 is a drawing of a bucket-brigade system embodying the invention.

The circuit of FIG. 1 includes a charge transfer bucket-brigade image sensor array 10 whose rows are scanned one at a time by means of a vertical (V) scan generator 12 and a row selector 18. The V-scan generator 12 and row selector 18 are in themselves well known. The former may include a register which produces a single output at a time on one of its output lines. The V-scan generator 12 has eight output lines corresponding to the eight rows of array 10. Each output line is connected to a different stage of the row selector 18. A V-clock generator 14 connected to the V-scan generator 12 controls its frequency of operation and a V-start generator 16 connected to V-scan generator 12 controls its periodicity.

The row selector 18 may include a group of gating circuits and is connected between V-scan generator 12 and the rows of the array 10. A horizontal clock generator 20, connected to row selector 18, produces clock pulses H1 and H2 which may be assumed to be complementary pulse trains which swing between +V volts and −V volts. The clock pulses (H1, H2) are gated through row selector 18 to the clock conductors (e.g., 11, 13) of the row of array 10 whose corresponding row selector stage is energized by a signal from V-scan generator 12.

The image sensor array 10 is shown for purpose of illustration to have 8 rows. Each row includes a plurality of transistors having their source-drain paths connected in series. As shown for row 1, the drain of one transistor is connected to the source of the adjacent transistor and they may in fact share the same diffused region. The drain of the last transistor of a row is connected to an output point (e.g., $O_{31}$, $O_{32}$...$O_{38}$). A capacitor is connected between the gate and drain of each transistor for alternating current (AC) coupling to the drain the clock pulses applied at the gate. This circuit arrangement is known as a bucket brigade and is described, for example, in U.S. Pat. No. 3,546,490 issued to F. L. J. Sangster entitled "Multi-Stage Delay Line Using Capacitor Charge Storage."

At the drain of each transistor is a photodiode which discharges (or charges) the capacitor to which its anode is connected as a function of the light incident on the photodiode. The function of the photodiodes and their operation are described in detail in my copending application, Ser. No. 83,923, now U.S. Pat. No. 3,683,193, entitled SENSORS EMPLOYING "BUCKET BRIGADE" SCANNING.

The output points ($O_{31}$, $O_{32}$...$O_{38}$) of the array are coupled to a single output terminal 70 by fan-in circuit 30. The fan-in circuit 30 which provides a conduction path between each row output point ($O_{31}$, $O_{32}$...$O_{38}$) and output terminal 70, includes three charge transfer sections (31, 33, 35).

The sensor outputs ($O_{31}$, $O_{32}$...$O_{38}$) are coupled through capacitors (C31, C32,...C38) to a conductor 32 and the (ungated) H1 clock pulses are applied to this same conductor.

At each transfer stage the conduction channels of two transistors are connected to a common output terminal thereby combining two channels into one channel. The first transfer stage 31 includes eight transistors (T31 through T38), each transistor being connected at its source to one of the output points of the sensor. The eight transistors are paired (e.g., transistor T31 and T32), every such pair of transistors is connected at its drain to a node (e.g., O21) which is common to the source of a transistor (e.g., T21) of the subsequent transfer stage (e.g., 33). In the first transfer stage, eight conduction paths emanating from the eight sensor rows converge into four nodes (O21 through O24).

The second transfer stage 33 includes 4 transistors (T21 through T24) which are paired to produce two output points (O11, O12). The third transfer stage 35 includes two transistors (T11, T12) connected at their drains to output terminal 70.

An output current corresponding to the potential at terminal 70 is developed through the conduction path of transistor To and flows into output current line 80.

A capacitor (e.g., C21) is connected at one end to the drains of each pair of transistors (e.g., T31, T32) at the other end to a common conductor (e.g., 34). The gates of all transistors (T31...T38) in the same section are also connected to this common conductor. The capacitor present at each drain couples to the drain the clock signal applied at the gate of the transistor and serves also to store the charge transferred to the drain node from the preceding source. The value of the capacitor at each node should be approximately equal to that at any other node and to the capacitance of each elemental capacitor in the rows of the sensor.

There is one clock conductor per transfer stage. The H1 clock is applied to every other conductor (32, 36, and 40) and the H2 clock is applied to the remaining conductors (34 and 38).

By way of example, the parameters and operation of a circuit such as shown in FIG. 1 may be as follows:

1. The transistors of the image sensor 10 and those of the fan-in circuit 30 may be of N conductivity type. (N regions diffused in a P-type substrate).
2. For N-type devices, a zero signal (or no signal) exists when a node is most positively charged. With the clock pulses swinging between −V volts and +V volts, a fully charged node swings between +V volts and 3 × V volts. A signal causes a reduction in the positive charge present at the source node of a transistor and as a result the potential at the source node swings below the values of +V and +3 V.
3. For conduction to occur in N-type transistors, two conditions must exist. The gate must be pulsed positively (in a direction to turn the transistor on) and the gate potential must be more positive than the source potential. With the gate more positive than the source, electrons are transferred from the source node to the drain node until the source is charged sufficiently positive to cut off the transistor. If the source potential is equal to the gate potential ($V_{GS} = 0$), the transistor does not conduct even though the drain is highly positive.
4. The outputs ($O_{31}$...$O_{38}$) of the rows not being scanned swing between +V volts and +3V volts corresponding to the zero signal condition.

The operation of any row of the sensor 10 is identical to another and only the operation of row 1 is detailed below. Assume that the photodiodes of row 1 in response to incident light have discharged the capacitive nodes to which they are connected and that row 1 is now selected to be scanned.

The V-scan generator 12 applies a pulse on line 1 energizing the corresponding first stage of row selector 18 which then allows the H1 and H2 clock pulses to be applied to conductors 11 and 13, respectively. When the H1 clock goes positive (H2 clock goes negative), the transistors of row 1 connected at their gates to conductor 11 are turned on and transfer any signal present at their source to their drain. The remaining transistors are cut off. When the H2 clock goes positive (H1 clock goes negative) the transistors of row 1 connected at their gates to conductor 13 are turned on and transfer signals from their source to their drain. The clock pulses thus cause the signals generated at the photosensitive nodes of row 1 to advance (to the right in FIG. 1) by one stage per clock pulse cycle and to be serially produced at output node O31. It is evident that any other row could, as well, be selected for read out and its contents serially produced at the output terminal of the row.

The propagation of signals along any conduction path of the fan-in circuit 30 is identical to any other and only the operation of the conduction path associated with row 1 is detailed below. Signals present at output node O31 of row 1 are transferred to node O21 when transistor T31 is turned on by a positive going ungated H2 clock pulse. If, when the H2 pulse goes to +V volts, the potential at node O31 is assumed to be less than +V volts (due to the presence of a signal) transistor T31 conducts causing the transfer of the signal from node O31 to node O21. The other transistors (T32 through T38) do not conduct since their source potential is equal to their gate potential (+V volts).

At node O21 there is the convergence of two conduction paths. One path includes transistor T31 for coupling signals from row 1 and the other path includes transistors T32 for coupling signals from row 2. The point of convergence is virtually isolated from every signal node except one. For example, when transistor T31 couples a signal into node O21, transistor T32 is nonconducting, and its source-drain path appears as a very high impedance and transistor T21 whose source is connected to node O21 is cut off since its gate is driven by the H1 clock. Therefore, node O21 is isolated from every other node except the one to which it is coupled by transistor T31. Therefore, virtually all the charge present at node O31 is transferred to node O21. It should be emphasized that substantially total signal transfer is repeated at every node thus making the charge transfer fan-in circuit a highly efficient means of transferring signals.

On the next positive going H1 pulse, the signal is transferred from node O21 to node O11 and so on, the next positive going H2 pulse the signal is produced at output node 70.

When a signal has been propagated to the common output node 70, the voltage present there can be sensed by voltage-sampling means and the output current at terminal 80 can be derived by current sampling means, both well known in the art As demonstrated from row 1, every output point of array 10 is coupled to output terminal 70 by the same number of transistors and the transistors forming the series conduction paths are alternately enabled and controlled by clock pulses. The conduction paths are all of equal length in that they all delay the signals being propagated by the same time span. As a result, regardless of which row is being scanned, the signals at the output terminals of the sensors are delayed the same amount so that there is no timing problem.

It should be appreciated that the transistors of the fan-in or "converging tree" circuit 30 behave as unidirectional conducting devices. They provide an easy conduction path from a node (source of transistor) to a subsequent converging node (drain of transistor) while blocking or preventing signals from flowing back from the subsequent node to a preceding node. This feature is in sharp contrast to transmission gates operated in the conventional way which when turned on conduct bidirectionally. In the fan-in circuit 30 all the transistors of a transfer stage can be simultaneously clocked with only one of the transistors providing a low impedance conduction path. If transmission gate transistors operated in conventional fashion were used instead of the bucket brigade type transistors, the clock signals to the transmission gates would have to be gated to allow only one path to conduct. This would considerably complicate the circuit (in addition, it would add considerable capacitance to the circuit as discussed above).

Another important aspect of the invention is that as the signals are transferred from node to node, there is little, if any, attenuation of the signal. This results from the transfer of charge from a node having a given (elemental) capacitance to a subsequent node having approximately the same (elemental) capacitance. In the bucket brigade registers charge is transferred from one region (source electrode) of the transistor to a second region (drain electrode). The potential at the source electrode is a function of the capacitance at that node as defined by the classic relationship of $V = Q/C$. Assuming that all the charge at the source electrode is transferred to the drain electrode, it is evident that the potential charge at the drain will equal the signal (due to the efficient bucket brigade type of charge transfer) formerly present at the source only if the capacitance (C) at the latter is equal to the capacitance at the former. It is, therefore, desirable to make the capacitance at each node the same (e.g., Co = C11 = C21 = C31, etc.). Maintaining these nodal capacitances equal ensures that the amplitude of the signals being propagated is not reduced or attenuated as it is transferred into the combined channels.

Figure 2:
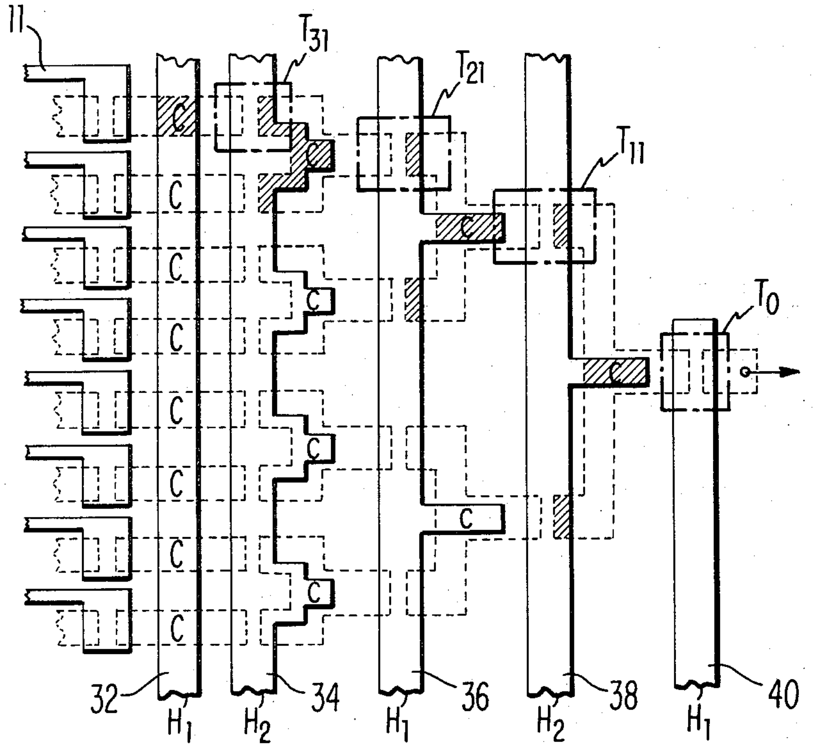
FIG. 2 is a top view of a part of the circuit of FIG. 1.

To this end, FIG. 2 illustrates a layout of part of the fan-in circuit 30 of FIG. 1 showing how the capacitances at all nodes can be made substantially equal. In the bucket-brigade circuits the gate-to-drain capacitance may be made by extending the metallic gate region a known amount over the drain region. This capacitance is a function of the metallic area overlying the drain region. As shown by the cross-hatched area in FIG. 2, the capacitance at each node may be fabricated so that it is approximately equal to that at any other node. FIG. 2 also illustrates the relative simplicity of the structure.

It should also be noted that the nodal capacitance of the fan-in circuit can be made approximately equal to the elemental capacitance of the image sensor. This provides an ideal system for reading out the information signals developed in the sensor since this permits the elemental photo signal to be transferred to the output terminal with virtually no attenuation.

In the circuit of FIG. 1, the fan-in ratio is 2:1. That is, every two channels converges to one channel at each transfer stage. For the eight channel system of FIG. 1, three transfer stages are required to converge eight rows to one output terminal. To accommodate an image sensor having 512 rows, nine transfer stages would be required to converge the row outputs to one output terminal.

The optimum fan-in ratio for combining channels may be other than 2:1 and in some cases will have to be determined by experiment. Maintaining a small converging ratio as shown in FIGS. 1 and 2 enables the capacitance at each node to easily be made equal. If the ratio were made large (e.g., 3:1, 10:1, or 512:1), the stray capacitance between a single long conductor and the substrate, in addition to the gate capacitance of the many transistors, would be very large. This would result in substantial attenuation of the signal voltage and substantially reduce the transfer efficiency as well as causing poor frequency response. However, if this unwanted capacitance can be kept small, a larger fan-in ratio than two in a single transfer stage would be satisfactory. This again depends on keeping the total gate-drain capacitance of the combined transistors approximately equal to the individual capacitors at each individual input. If this can be achieved, then it would be feasible to have, for example, each of the 512 rows of an array such as array 10 coupled through a single charge transfer stage to the output terminal.

It has been shown that the fan-in circuit combines the signals from a large number of inputs or rows into a single output while utilizing the principles of charge transfer at each step. The output from each row is delayed the same amount so that no timing problem occurs and there is little, if any, attenuation along the conduction paths. It is also evident that even for large numbers of inputs the numbers of transfer stages necessary to couple the rows to the output terminal is relatively small. Thus, the signal from any one row does not have to be transferred through a disproportionate number of stages and there need be little, if any, attenuation as the channels are branched in.

Figure 3:
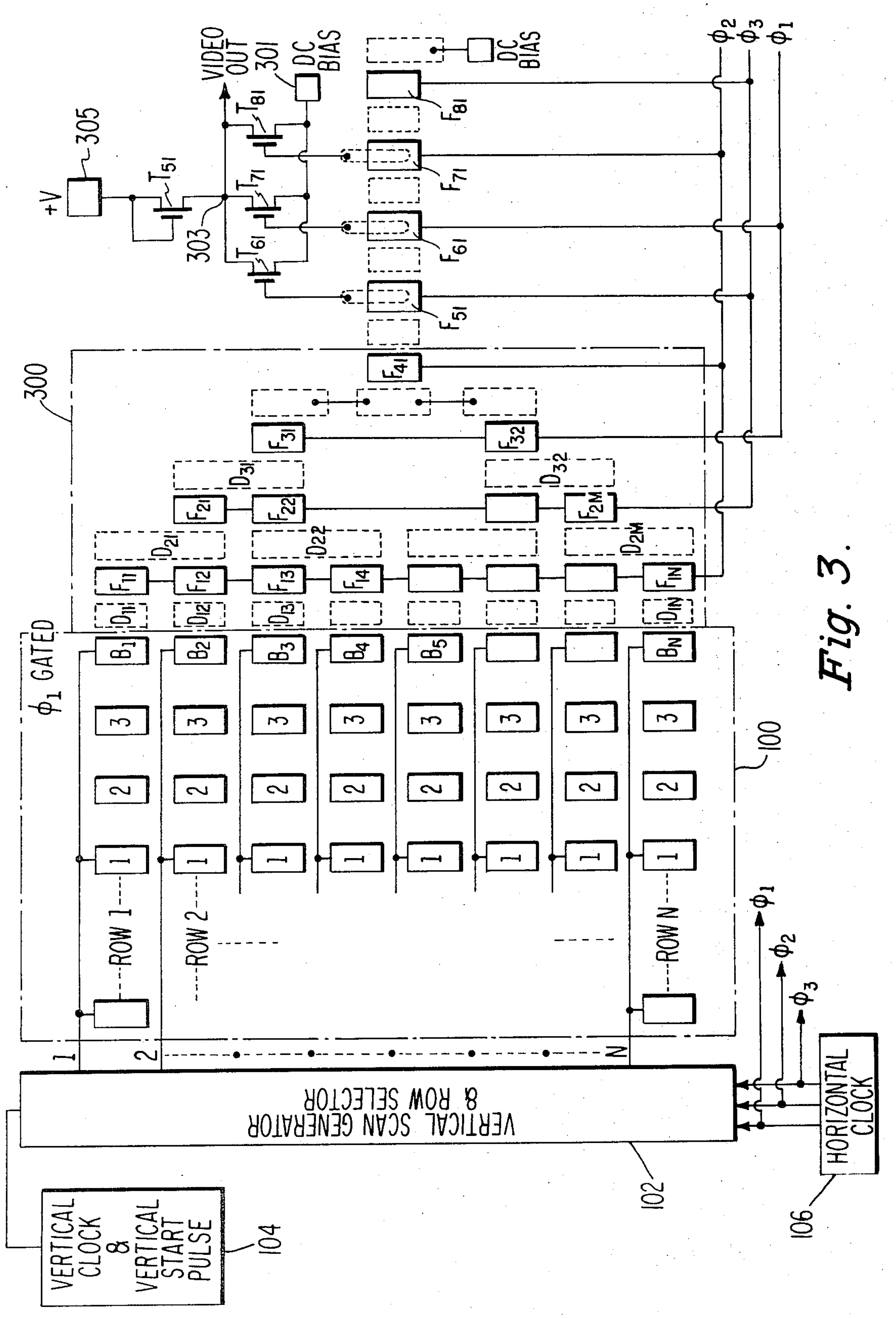
FIG. 3 is a drawing of a charge coupled arrangement embodying the invention.

In the circuit of FIG. 3 a charge transfer fan-in circuit 300 using charge coupled devices multiplexes the outputs of an image sensor 100 to a single output terminal.

Each row of array 100 is scanned one at a time by means of a vertical scan generator and a row selector circuit included in box 102 which in turn is driven and controlled by a vertical clock and vertical start pulse generator 104. In an analogous manner to the circuit of FIG. 1, the vertical generator and row selector 102 routes the three phase horizontal clock pulses ($\phi_1$, $\phi_2$, $\phi_3$) generated by horizontal clock 106 to one of the rows of array 100 at a time.

The array 100 is an image sensor of the charge coupled type and photo signals generated underneath the various electrodes are, at some selected time, propagated from underneath one electrode to underneath the next electrode of a row by the successive application of clock pulses $\phi_1$, $\phi_2$, and $\phi_3$ to the row being scanned. The last electrode of each row ($B_1$...$B_N$) is denoted by the letter B with a subscript corresponding to the order of the row.

Adjacent to the last electrode of each row is a first fan-in stage having N metal gates or electrodes (F11, F12,...F1N) which is equal in number to the number of rows. The convergence of the outputs of array 100 is begun by the second fan-in stage having M metal gates or electrodes (F21, F22,...F2M) where M is a considerably smaller number than N. The number of electrodes decreases to two electrodes (F31, F32) at the next stage. The conduction paths defined by electrodes F31 and F32 converge into a single channel formed by electrode F41 which begins the output section of the fan-in circuit.

Between the electrodes of each successive stage there are diffused islands shown with dotted lines and denoted by a letter $D_{ij}$. The first digit of the subscript denotes the number of the stage and the second digit denotes the position of the island in the stage.

The output circuit is comprised of a single conduction channel defined by electrodes F51, F61, F71, and F81 to which is connected transistors T51, T61, T71, T81. The output circuit amplifies every signal bit by the same amount and for one full clock cycle ($\phi_1$, + $\phi_2$, + $\phi_3$). Transistor T61, T71, and T81 are connected at their source electrodes to DC bias point 301, at their drain electrodes to video output 303 and at their gate electrodes to the diffused region underneath electrodes (F51, F61, and F71, respectively. Transistor T51 is a load transistor, connected at its source and gate electrodes to power terminal (+V) and at its drain to video output 303.

The operation of the circuit of FIG. 3 will be explained using row 1 as an example. A gated $\phi_1$ pulse transfers the charge underneath electrode 3 of row 1 to underneath electrode B1. The next $\phi_2$ pulse causes the charge underneath electrode B1 to be transferred to underneath electrode F11. The next $\phi_3$ clock pulse advances the signal to underneath electrode F21. The next $\phi_1$ pulse advances the signal to underneath electrode F31. The next $\phi_2$ clock pulse causes the charge to be transferred underneath electrode F41.

In a similar manner, the charge from any other of the sensor output terminals can be selectively routed to the output channel.

A $\phi_3$ pulse then transfers the charge from underneath electrode F41 to electrode F51. From here the next $\phi_1$, $\phi_2$, and $\phi_3$ pulses cause the signal to pass to underneath electrodes F61, F71, and F81. The charge present underneath electrodes F51, F61, and F71 is applied to the gates of transistors T61, T71, and T81 whose output are combined (orred) to produce a video output signal for a full cycle which includes the duration of a $\phi_1$, a $\phi_2$, and a $\phi_3$ pulse.

The diffused islands ($D_{ij}$) enable the charge coupled circuit to work well in the latter stages of the fan-in circuit where charge must flow relatively long distances along the surface of the substrate. For example, charge flowing from the top and bottom rows have to flow for long distances between electrodes. The diffused islands, therefore, provide long connecting bars for combining widely separated groups of conduction paths near the end of the register.

Charged-coupled paths with diffused islands interposed between adjacent electrodes can provide significant advantages in applications where it is necessary to make multiple parallel contacts in or out of the paths. One example, would be a serial-input parallel-output charge-coupled generator where each diffused island would be directly connected to the gate of an MOS transistor. This, of course, would provide series-to-parallel conversion of data applied at the input.

Another example would be a charge coupled register where parallel input signals from separate conductors would be connected to the interelement diffused islands. The register would then serially shift the information for effecting a parallel-to-series conversion of the input signals.

The charge-coupled circuit of FIG. 3 has been illustrated using a three phase clock. It should be appreciated that the circuit embodying the invention could be made to accommodate and be driven from a two phase clock or any other compatible clocking scheme.

In the circuit of FIG. 2 the sensor and the fan-in circuit are of the bucket-brigade type, and in the circuit of FIG. 3 the sensor and the fan-in circuit are of the charge coupled type. It should be appreciated that the system could as well include an image sensor of one type and a fan-in circuit of the other type.

What is claimed is:

1. In combination in a charge transfer circuit:

a multiplicity of input points and an output terminal;

means for producing signals at only one of said input points at a time;

capacitance means coupled to each of said input points and said output terminal, the capacitance at each of said input points being approximately equal to the capacitance at said output terminal; and charge transfer means connected between said input points and said output terminal providing converging transfer paths between said input points and said output terminal, each of said transfer paths including the same number of charge transfer devices and each such path introducing substantially the same time delay between its input point and said output terminal; each of said transfer paths transferring the charge from the capacitance at the respective input point to the capacitance at said output terminal with little loss of signal level; and means coupled to said charge transfer means for concurrently applying clock signals to every transfer path for turning on every other one of said charge transfer devices along said paths and turning off the intervening devices along said paths during a first time interval, and for turning on said intervening devices and turning off said every other devices along said paths during a second time interval for transferring the signals from said input points along said transfer paths to said output terminal.

2. The combination as claimed in claim 1 wherein said charge transfer means is of the bucket-brigade type and wherein said charge transfer devices of a transfer path are connected in series, some of said devices being common to more than one path for gradually converging the multiplicity of transfer paths associated with said multiplicity of input points to one path at said output terminal.

3. The combination as claimed in claim 1 wherein said charge transfer means is of the charge-coupled type and wherein said charge transfer devices of a transfer path are arranged in series, some of said devices being common to more than one path for gradually converging the multiplicity of transfer paths associated with said multiplicity of input points to one path at said output terminal.

4. The combination as claimed in claim 1 wherein each transfer device includes a transistor having source and drain regions defining the ends of a conduction channel and a gate, and a capacitor being connected between said drain and said gate;

each transistor being connected at its source to an input point or node, and at its drain in common with the drain of at least one other transistor to a succeeding node along its associated conduction path, the connection of the drains of at least two transistors being defined as a node;

the capacitance at each node being approximately equal to the capacitance at a succeeding node; and those transistors having the same position along their conduction paths being connected in common to a line adapted to receive said clock signals.

5. The combination comprising:

M input terminals for the application thereto of input signals, one output terminal and a multiplicity of sets of intermediate nodes arranged between said M input terminals and said one output terminal, that set of intermediate nodes closest to said input terminals having a lower number of nodes than M and each succeeding set of nodes in a direction from said input terminals to said output terminal having a smaller number of nodes than the preceding set of nodes;

a plurality of charge transfer means for coupling each one of said M terminals to one node of the next set of nodes and each node of said next set of nodes to one of the succeeding set of nodes, each set of nodes being so connected to the next set and each one of the nodes of the last set of said multiplicity of sets being connected to said output terminal for gradually converging said M input terminals to said output terminal;

capacitance means associated with each of said terminals and nodes, the capacitance at each one of said terminals and nodes being approximately equal for enabling the transfer of charge from one point to a succeeding point with little loss of signal level; and means coupled to said charge transfer means for applying signals to the transfer means for concurrently enabling all the transfer means coupling said M terminals to said next set of nodes during one time interval and for concurrently enabling all the transfer means coupling said next set of nodes to said succeeding set of nodes during a second time interval.

6. The combination as claimed in claim 5 wherein each of said charge transfer means is one of the bucket-brigade type.

7. The combination as claimed in claim 5 wherein each of said charge transfer means is of the charge-coupled type.

8. The combination as claimed in claim 7 wherein each of said means for coupling the nodes from one set of nodes to one node of the next succeeding set of nodes includes a diffused region positioned between the said nodes of said one set and said one node of said next succeeding set.

9. A converging charge-transfer tree comprising in combination:

a plurality of input terminals;

means for applying input signals to only one of said input terminals at a time;

a common output terminal;

a plurality of transfer paths, each extending from a different input terminal to said common output terminal, each path comprising the same number of charge-transfer elements, and a plurality of said charge transfer elements being common to more than one path; and means for transferring a signal present at any input terminal to said common output terminal comprising means for concurrently applying a voltage to turn on every other charge transfer element in all the paths between said input terminals and said output terminal during one time interval and for applying a voltage to turn on every intervening charge transfer element in all the paths between said input terminals and said output terminal during a second succeeding time interval with only those charge transfer elements in that one of said paths which is connected to an input point to which signals are applied being rendered conductive.

10. In the combination of claim 9, each charge transfer element comprising a field-effect transistor having a conduction channel and a control electrode for controlling the conductivity of said conduction channel, each path comprising the series connected channels of a plurality of said transistors.

11. In the combination as set forth in claim 9, each charge transfer element comprising a charge coupled device which includes a region of a semiconductor substrate and electrode means adjacent to said region for causing a charge representing an information signal to be stored in said region in response to the application to said electrode means of an operating voltage during the time an information signal is applied to said region, each path comprising the series coupled semiconductor regions of a plurality of said devices.

12. The combination as claimed in claim 11 wherein said charge transfer means includes a diffused region in the semiconductor substrate formed between adjacent electrode means.

13. In the combination as set forth in claim 9, further including at each input terminal, and at each connection in each path between one charge transfer element and the next charge transfer element a capacitance of approximately the same value.

14. In the combination as set forth in claim 10, said converging tree including a plurality of nodes, each serving as the terminus of the conduction channels of transistors in at least two converging paths and also as an input terminal to the conduction channel of a third transistor, further including a capacitor at each node connected at one terminal to said node and at its other terminal to the control electrodes of said transistors in said two converging paths.

* * * * *